Feb. 13, 1940.     E. G. BAUM     2,190,509
APPARATUS FOR CAPPING BOTTLES
Filed Feb. 5, 1936     6 Sheets-Sheet 1
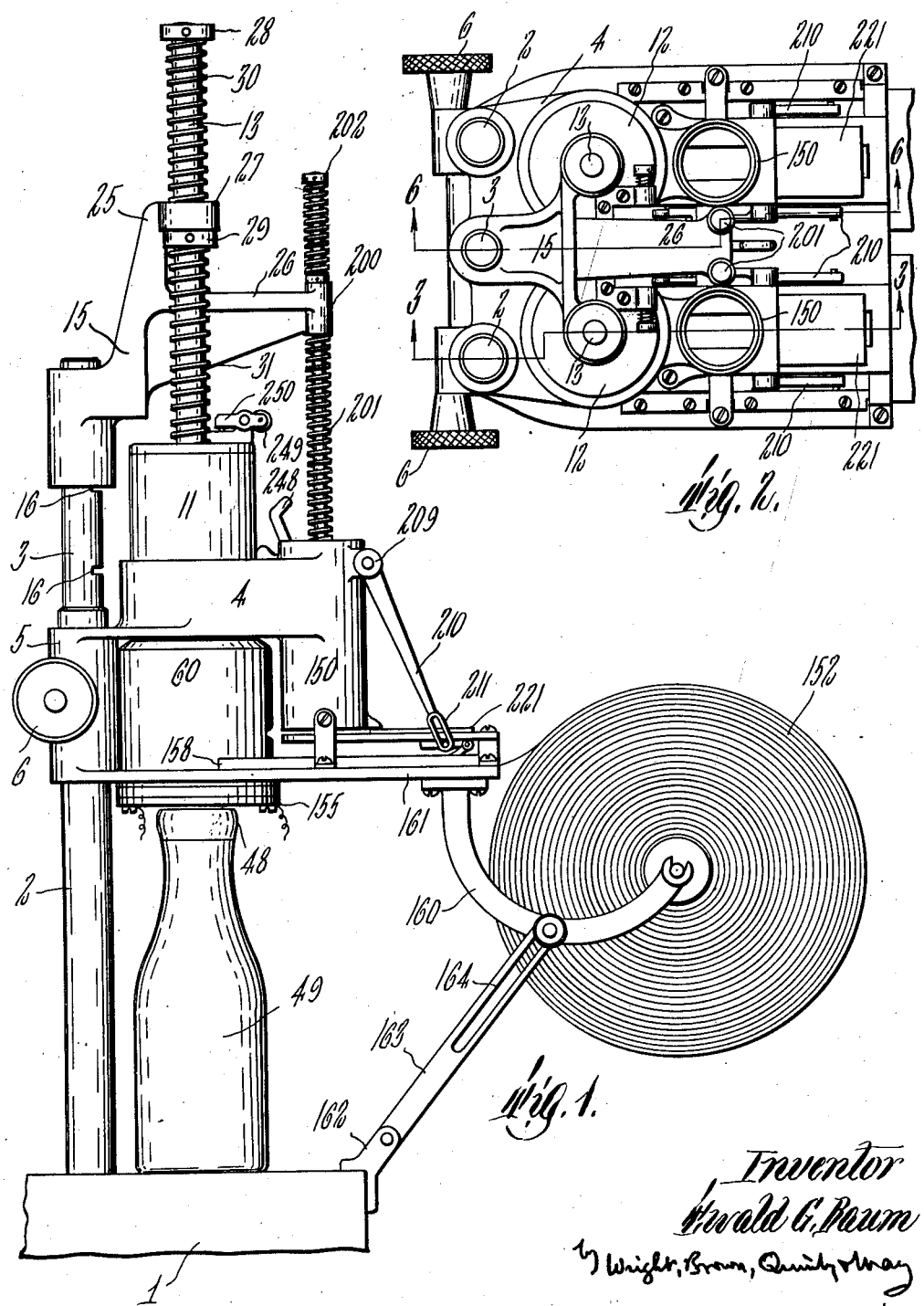

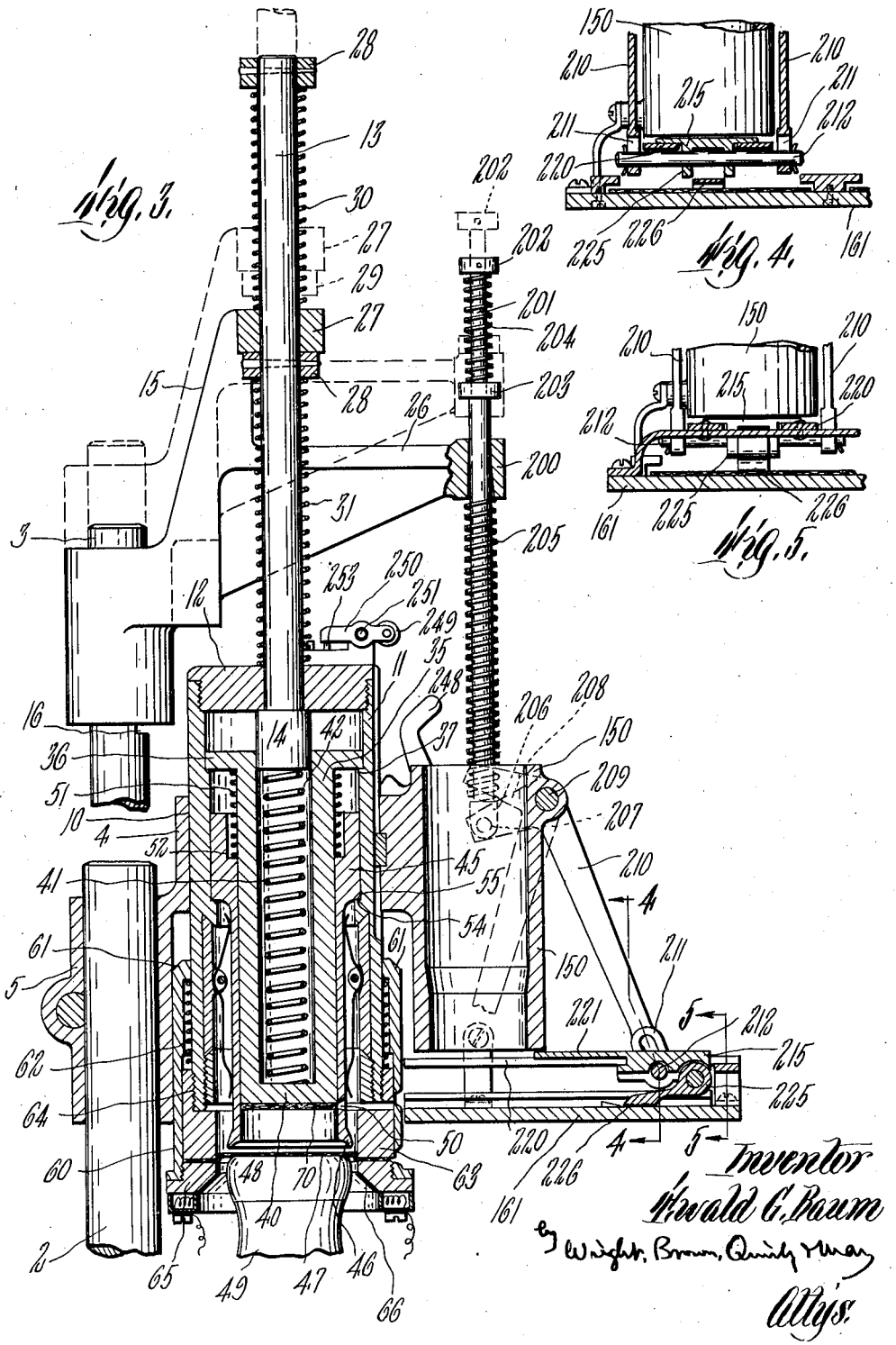

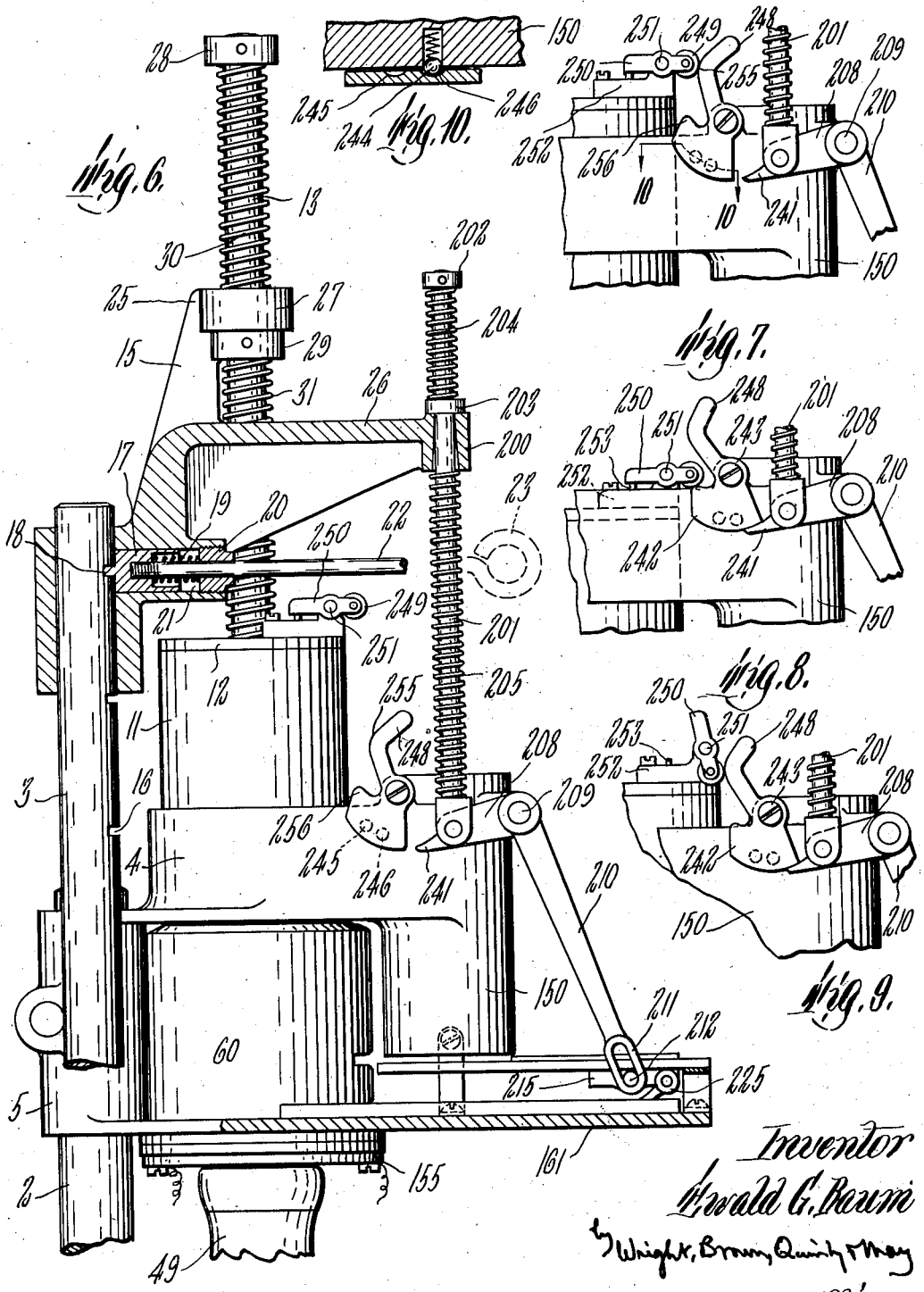

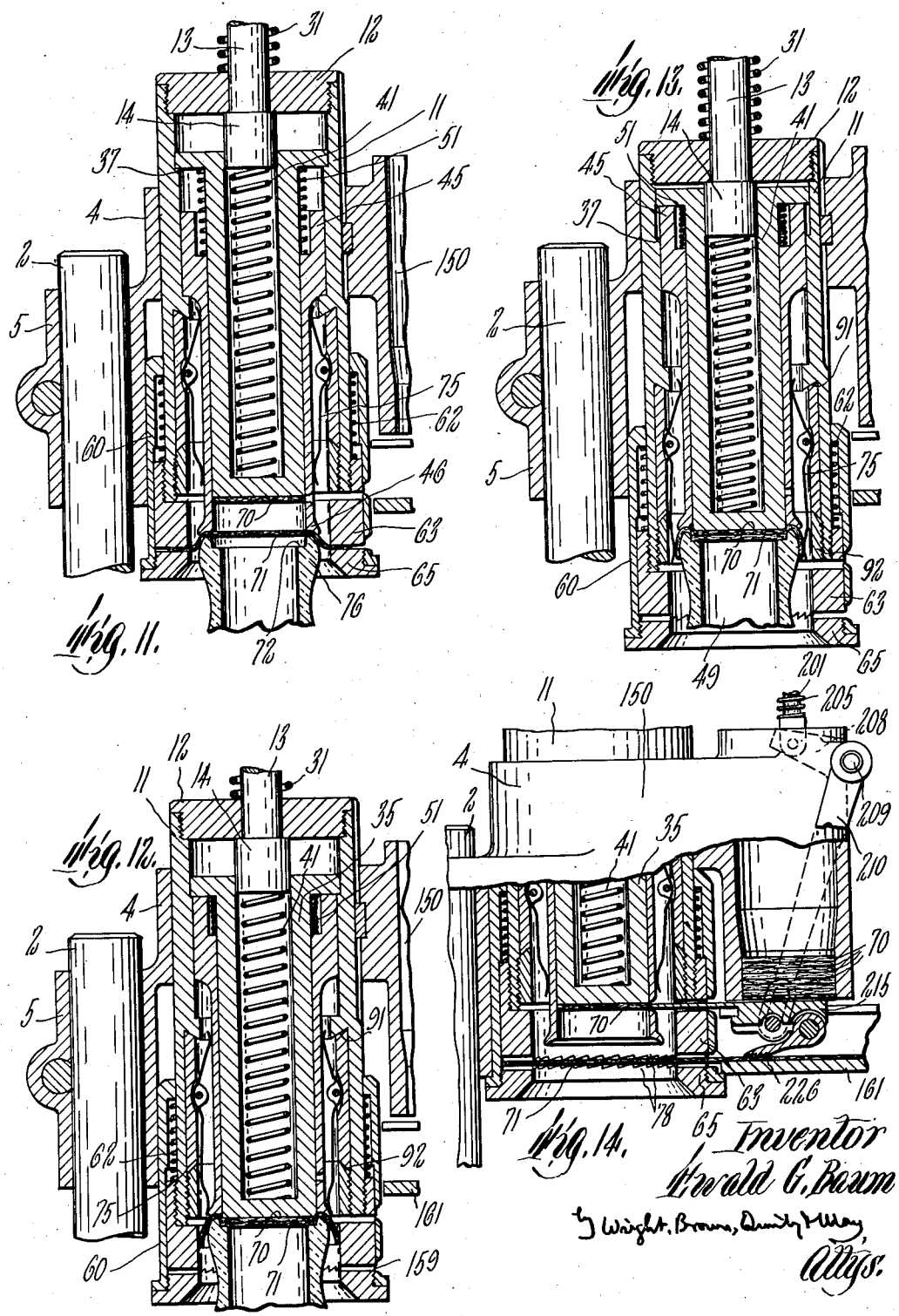

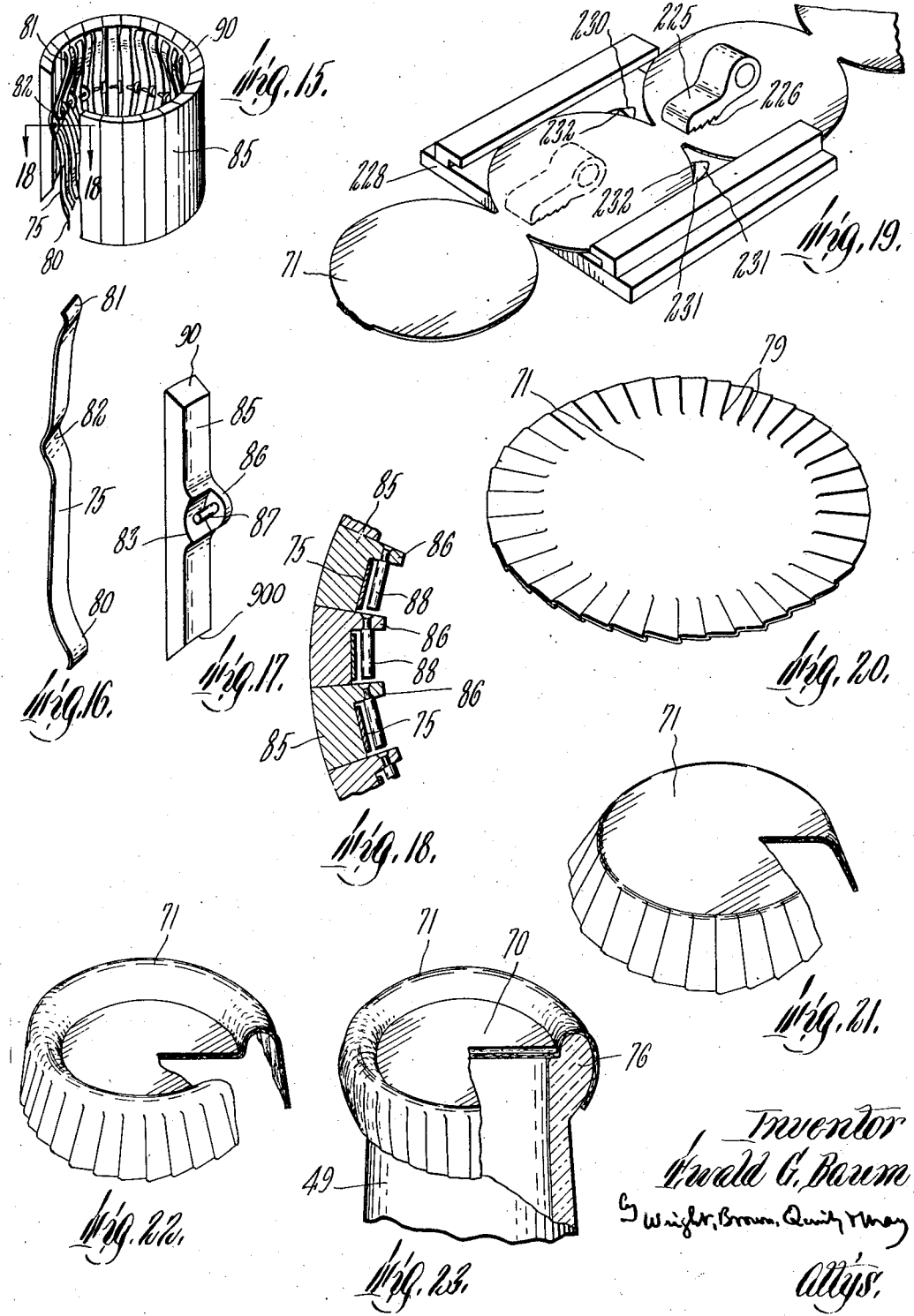

Feb. 13, 1940. E. G. BAUM 2,190,509
APPARATUS FOR CAPPING BOTTLES
Filed Feb. 5, 1936 6 Sheets-Sheet 6
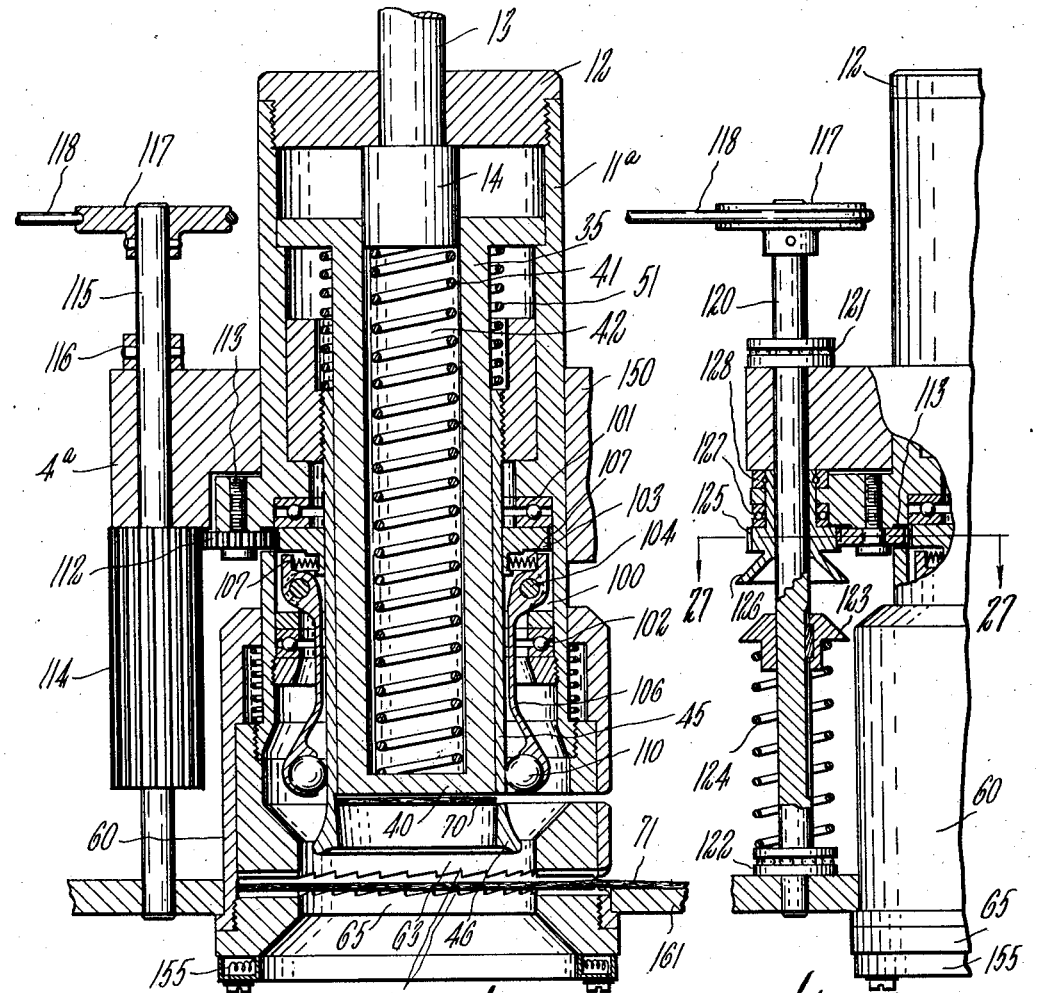
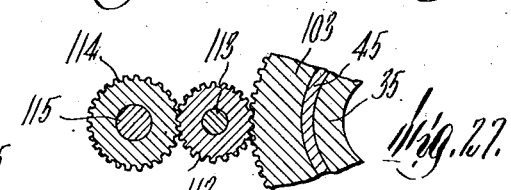
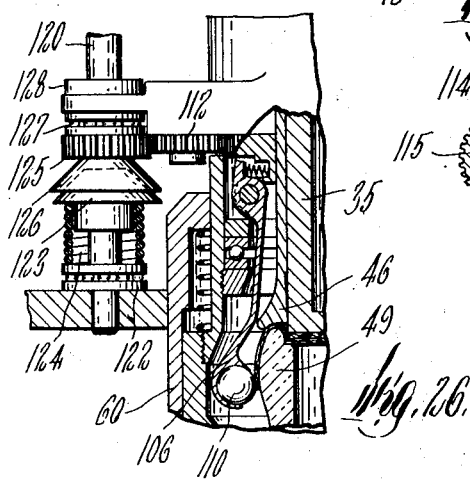

Patented Feb. 13, 1940

2,190,509

UNITED STATES PATENT OFFICE 2,190,509

APPARATUS FOR CAPPING BOTTLES

Ewald G. Baum, Natick, Mass., assignor to American Seal-Kap Corporation of Delaware, Wilmington, Del., a corporation of Delaware Application February 5, 1936, Serial No. 62,469

17 Claims. (Cl. 226—80)

This invention relates to the capping of bottles and more particularly to those in which milk and cream are commonly sold.

One object of this invention is to close the bottle by a cap which covers over the pouring lip so as to protect all portions of the bottle mouth with which the milk is liable to contact from contamination.

A further object is to form the caps directly on the bottles from materials which can be packed for shipment in convenient and compact form so that they may be shipped with great economy.

A further object is to provide a cap construction which requires little fabrication previous to shipment and from cheap materials so that cost of material delivered to the capping machine may be small.

A further object is to produce a capping machine capable of taking the materials as shipped and forming them to and securing them in sealing relation to the bottle mouths.

A still further object is to so form the machine that it can be applied as a unit to a well known form of bottle filling machine to properly function therewith.

Still another object is to provide such a machine which shall be responsive to the presence of a bottle in order to be actuated.

To the accomplishment of these and other objects, as may later appear, each cap as delivered to the capping machine comprises a piece, preferably a disk of suitable material such as waterproof paper having a margin so treated that it may be applied about and conformed to the outside wall of the bottle below its mouth and after having been so conformed will retain its shape, sealing off the contents of the bottle and protecting the pouring lip against the possibility of being contaminated in any way as long as the cap remains sealed thereto. If desired, also, and preferably, a smaller disk such as is commonly used to close a milk bottle, may be superposed on the central portion of the larger disk to reinforce it and the two forced down together against the internal annular ledge with which milk bottles are ordinarily provided.

In order that the material for the caps may be packaged economically the large pieces or disks may be partly cut from a strip which may be wound into a coil or roll. This coil may be unwound as needed by the capping machine and the partially severed pieces completely severed successively as they are required. The smaller disks are commonly completely cut and arranged in stacks from one end of which they are removed as required and they may be supplied so packaged for use with the machine of this invention.

In order that the margins of the larger disks shall remain in close engagement with the bottle necks after having been conformed thereto by the capping machine, they may be suitably treated, and if desired, by material which may be temporarily softened in the capping machine in order to facilitate their conformation to the bottle. The machine may therefore be provided with suitable cap-softening means.

For a more complete understanding of this invention, reference may be had to the accompanying drawings in which Figures 1 and 2 are side elevation and top plan views, respectively, of the capping portion of a bottle filling and capping machine.

Figure 3 is a section on line 3—3 of Figure 1.

Figures 4 and 5 are detail sections on lines 4—4 and 5—5, respectively, of Figure 3.

Figure 6 is a section to a larger scale of the machine on line 6—6 of Figure 2 and showing "no bottle" mechanism.

Figures 7, 8 and 9 are fragmentary elevations of parts shown in Figure 6, Figures 7 and 8 showing the lower limit of motion of the capping mechanism with and without a bottle present, respectively, and Figure 9 showing the mechanism on the up stroke.

Figure 10 is a detail section on line 10—10 of Figure 7 but to a larger scale.

Figures 11, 12 and 13 are sections similar to a portion of Figure 3, but showing successive stages in the capping of a bottle.

Figure 14 is a view partly in section and partly in side elevation showing the cap feeding mechanism in its inner position.

Figure 15 is a fragmentary perspective of the disk-conforming mechanism.

Figures 16 and 17 are perspective views of portions of the mechanism shown in Figure 15.

Figure 18 is a detail section on line 18—18 of Figure 15.

Figure 19 is a fragmentary perspective showing the disk strip and its manner of feeding.

Figures 20, 21 and 22 are perspectives, Figures 21 and 22 being partly broken away, and showing successive conditions of the disk as it is being conformed to the bottle.

Figure 23 is a fragmentary perspective partly in section showing the bottle capped.

Figure 24 is a view somewhat similar to Figure 16 but illustrating a modification.

Figure 25 is a fragmentary view partly in side elevation and partly in vertical section showing a further modification.

Figure 26 is a fragmentary view partly in section illustrating certain of the mechanism of Figure 24 in a different position.

Figure 27 is a detail section on line 27—27 of Figure 25.

*Cap forming and applying mechanism*

Referring first to Figure 1, at 1 is indicated a platform for supporting bottles to be capped. This may be the bottle-supporting platform of a well known form of a bottle filling and capping machine known commercially as the Milwaukee filler. These machines are provided with a pair of stationary posts or rods 2 upstanding therefrom in spaced relation to which may be adjustably clamped stationary portions of a bottle capping machine and between these posts 2 is positioned an axially movable upright bar or rod 3 which is reciprocated to effect capping and bottle-releasing operations. Applied to these rods 2 and 3 are the stationary and actuating portions of the capping mechanism of this invention. The stationary parts comprise a pair of bracket arms 4 each having an integral sleeve portion 5 which may be secured at the desired elevation rigidly to the bars 2, as by means of the clamp nuts 6 secured to suitable clamp screws in a manner well known in the art. The bracket 4, as shown, supports a pair of capping mechanisms so that two bottles may be capped simultaneously as is usual practice with such machines, although of course any other number desired might be employed. Each bracket 4, therefore, is provided adjacent to its sleeve portion 5 with a circular opening 10 within which is vertically slidable a sleeve 11. Each of these sleeves 11 is shown as closed off at its upper end, as by means of a threaded plug 12 through which extends slidably a rod 13 having a head 14 at its lower end of a size sufficient to prevent complete withdrawal of the rod 13 upwardly through the plug 12.

A bracket 15 is secured in any suitable way to the upper portion of the actuating rod 3, this rod being provided with slots 16 at suitable intervals to selectively receive securing means by which the bracket 15 may be fixed in the desired position with respect to the rod 3. As shown in Figure 6, this securing means may comprise a plug 17 having a fin 18 which may be projected into any selected slot by means of a spring 19 reacting between the plug 17 and a stationary plug 20 secured in the outer end of a socket 21 in which the plug 17 is slidable. A rod 22 having an eye 23 at its outer end to form a handle may be passed through a central opening in the plug 20 and be secured as by threading into the plug 17, so that by pulling outwardly on the eye portion 23 the plug 17 may be released from the notch 16 to permit the bracket 15 to be moved axially of the rod 3.

The bracket 15 has a pair of arms 25 and 26 projecting therefrom. The arm 25 is provided with a sleeve portion 27 through which the rod 13 extends. The upper end of this rod 13 has fixed thereto a collar 28, and a collar 29 is secured to the rod 13 below the sleeve 27. Surrounding the rod 13 between the sleeve 27 and the collar 28 is a coil spring 30, and surrounding the rod 13 between the collar 29 and the top of the plug 12 is a spring 31. Descent of the bracket 15, therefore, from the position shown in Figure 1, acts to depress the rod 13 positively and through the spring 31 to depress the sleeve 11 yieldingly. Slidable within the sleeve 11 is a hollow plunger 35 having a flange 36 at its upper end which may ride between the plug 12 and an annular shoulder 37 on the inner wall of the sleeve 11 spaced somewhat below the plug 12. The lower end of the plunger 35 is closed off as by a head portion 40, and seated on the upper end of this head portion is a coil spring 41 which is contained within the hollow central portion 42 of the plunger 35 and which bears against the lower end of the head 14, which is slidably guided in the portion 42.

Slidable between the outer face of the plunger 35 and the inner wall of the sleeve 11 is a sleeve 45, the lower end of which is formed as an annular clamp 46 which may be brought down to press sheet-capping material, as at 47, against the top of the bottle mouth 48 of the milk bottle 49 positioned therebeneath. Above the clamping portion 46 this sleeve 45 is provided on one side with a slot 50 through which disks, such as the usual cardboard disks commonly used for capping milk bottles, may be fed in to the interior of the sleeve 45 beneath the plunger head 40. A coil spring 51 reacts between the lower face of the plunger head 36 and the upper face of an annular socket 52 in the upper end of the sleeve 45 and yieldingly holds the sleeve 45 to its downward limit of motion provided by an internal annular shoulder 54 on the sleeve 11 with which engages a shoulder 55 of the sleeve 45. Outwardly of the sleeve 11 is vertically slidable thereon a sleeve 60. Its upper end is formed to closely and slidably embrace the sleeve 11 at 61, and below this point it is of larger internal diameter to house a coil spring 62 which reacts between the portion 61 and an upper annular clamping member 63 secured to the lower end of the sleeve 11 as by a threaded joint at 64. The lower end of the sleeve 60 carries a lower annular clamping element 65 which is depressed toward the clamping element 63 by the spring 62. This clamping element 65 is shown as provided with a flaring annular internal face 66 which may be projected over the bottle mouth during the capping operation, as shown in Figures 3 and 11, to guide the bottle mouth into proper position.

When the rod 3 is in its highest position the rod 13 is yieldingly held in its extreme upper position by the spring 30 and through the engagement of the head 14 on the lower face of the plug 12, the sleeve 11 with the parts carried thereby is also held in elevated position so that the bottle 49 may be moved beneath it as shown in Figures 1 and 6. In this position of the parts the disk 70 may be in position within the clamping sleeve 45 opposite to the slot 50 through which it was inserted, and in this position of the parts also the upper end of the sleeve 60 has impinged on the lower face of the bracket 4 and been stopped thereby, while the sleeve 11 carrying the upper clamp element 63 has been further raised to separate the clamping elements 63 and 65 so that a piece of sheet material 71 larger than the disk 70 may be placed therebetween as shown in Figure 14. This is the position of the parts when the bottle is placed in position for capping as in Figures 1 and 6. As the rod 3 is depressed for a capping operation the sleeve 11 is moved downwardly under increasing pressure of the spring 31, bringing the upper clamping element 63 downwardly to clamp the sheet material 71 against the lower clamping element 65, as shown in Figure 3, and the sleeve 45 is brought down toward the bottle top until it engages the sheet material and presses it thereagainst as shown in Figure 11, whereupon further downward motion of the clamping sleeve 45 is stopped. Further downward motion of the rod 13 acts with the increasing pressure of the spring 41 to depress the plunger 35, forcing the disk 70 ahead of it and into contact with the upper face of the sheet material 71, and on further downward movement of this plunger, the disk 70 superposed on the piece 71, is forced into the mouth of the bottle and seated against its annular internal shoulder 72, the sheet material 71 being pulled inwardly beneath the clamping sleeve 45 and from between the clamps 63 and 65. The parts are then in the position shown in Figure 12, the plunger 35 in the lower portion of its stroke engaging on the shoulder 37 of the sleeve 11 and carrying this sleeve, together with the annular clamping members 63 and 65 with it, thus freeing the marginal portion of the sheet material 71.

Further depression of the rod 13 acts through the spring 31 to carry the sleeve 11 further downwardly and causes a series of wiping elements 75 carried thereby to wipe down the marginal portion of the sheet material 71 about the mouth of the bottle, completely covering the pouring lip at its top and engaging the sheet material beneath its flaring rim or top portion 76, thus to complete the application of the disk 70 and the sheet material 71 to the bottle mouth. The rod 3 is then moved upwardly, raising the bracket 15 and acting through the spring 30 to lift the sleeve 11 with the parts carried thereby, and permitting these parts to return to the positions shown in Figure 14.

In order to facilitate the wiping of the sheet 71 about the top of the bottle, the clamping elements 63 and 65 may be provided with radially arranged serrations 78, as shown best in Figure 14, which act to define fold lines 79 for the sheet material as shown in Figure 20. The first downward motion of the clamping elements 63 and 65 thereafter acts to bend the margins of the piece 71 downwardly as shown in Figure 21. The disk 70 being superposed in the central portion of the sheet 71, which as shown is of disk form but of larger diameter than the disk 70, the two are pressed inwardly against the bottle ledge, the cap being formed as shown in Figure 22, while the action of the wiping elements 75 conforms to the margin of the piece 71 to the bottle top, as shown best in Figure 23. The central portion of the element 71 within the area of the mouth, and reinforced by the disk 70, closes the bottle, while the remainder of the element 71 is conformed to and about the pouring lip and the outer face of the bottle adjacent to its mouth.

In Figures 15 to 18 is shown a construction suitable for the wiping elements 75 together with their immediate mountings. As shown, each of these elements consists of a spring strip having its lower end turned inwardly and downwardly and outwardly as at 80, its upper end turned inwardly and then outwardly to form a bearing portion 81 which may ride on the outer face of the clamping sleeve 45, and an intermediate outwardly bent portion 82. Each of these wiping elements may be supported in a rigid bar 85 shown detached in Figure 17. Each of these bars is formed segmental in cross section so that a plurality may be arranged together in annular form as shown in Figure 15. Each is provided with an ear 86 extending inwardly from one edge portion, and from this ear a pin 87 extends substantially parallel to the adjacent front face of the bar, which is shown as formed concave at 83, to receive the bent portion 82 of the wiper element 75 between it and the pin 87. Preferably an anti-friction roller 88 is mounted on each pin as shown in Figure 17. When the bars are assembled as shown in Figures 15 and 18, these ears 86 in pairs form side walls to retain laterally therebetween the wiper elements 75 which are thus prevented from lateral separation from their respective bars 75. These bars may be secured in assembled annular array within the sleeve 11 in any suitable manner, but as shown their ends are beveled as at 90 and 900. Their upper ends engage a complementally beveled shoulder 91 on the inner face of the sleeve 11, and they are held in engagement with this shoulder by means of an annular collar 92 threaded into the lower end portion of the sleeve 11 and having a beveled upper face complementally formed to the beveled ends 91 of the bars 85. These wipers 75, therefore, are so mounted as to form an annular series of spring fingers, which, as the sleeve 11 is moved downwardly, engage the outer margin of the disk 71 and wipe it down about and under the enlarged mouth portion of the bottle.

In some cases it may be desired to impart a rotary motion to the wiping mechanism in order to spin the margin of the disk 71 about the mouth of the bottle. Where this is desired, constructions such as are shown in Figures 24 to 27 may be employed. In place of the bars 85 with their spring wiper fingers 75 the sleeve 11a shown in Figure 24 may be provided near its lower end with an enlarged diameter portion 100 within which may be supported upper and lower thrust ball bearings 101 and 102 between which may be mounted a ring member 103. This ring member may be provided with slots within which are pivoted, as on the pivots 104, levers 106. The upper ends of these levers are pressed outwardly as by coil springs 107 reacting between them and the inner ends of spring sockets 107 in the ring member 103 so as to press their lower ends toward the clamping sleeve 45. Within the lower end of each of these levers 106 may be journaled a ball 110 which engages with the marginal portion of the sheet material 71 during the capping operation. The ring member 103 may be provided at its upper portion with gear teeth which mesh with an idler gear 112 journaled on a stub shaft 113 secured to a portion of the sleeve 11a, and this idler 112 may mesh with a long gear 114 carried by a rotary shaft 115 journaled in a suitable portion of the supporting bracket 4a. A collar 116 secured to the shaft 115 may be used to hold the long gear 114 in desired axial position and the shaft 115 may be rotated by any suitable means, it being shown as provided with a belt pulley 117 at the upper end about which a driving belt 118 may be passed. Rotation of the shaft 115 will thus cause rotation of the wiping elements comprising the levers 106 with their ball ends 110 so that as the cap is being applied to the bottle the balls 110 will act to spin the material into engagement with the bottle top.

It may, however, not be desired in many instances to rotate the wiping fingers continuously as they function only when the cap is being applied, and in order that they may be idle at other times, the driving mechanism shown in Figures 25 and 26 may be substituted for that shown in Figure 24. In place of the driving shaft 15 with its long gear 114, may be substituted a driving shaft 120 to which the driving pulley 117 may be attached, this shaft 120 being supported by suitable thrust bearings as at 121 and 122. Slidably keyed to the lower portion of the shaft 120 is a conical clutch element 123 which is normally held in a somewhat elevated position as by means of a spring 124. The idler gear 113 meshes with a gear portion 125 of a clutch element 126 through which the shaft 120 rotatably passes. This element 126 is supported for rotation as by ball bearings 127 and 128 from the sleeve 11a, and when this sleeve is in its elevated position the element 126 is out of engagement with the clutch element 123, so that rotation of the shaft 120 is not transmitted to the wiping elements. However, when the sleeve 11a is depressed to effect a capping operation, the clutch element 126 is brought down into engagement with the clutch element 123 and both together are then pressed downwardly against the pressure of the spring 124 into the full cap applied position shown in Figure 26. During the time that the clutch elements 126 and 123 are in contact, rotation of the shaft 120 produces the desired rotary spinning action of the balls 110, but when the capping mechanism is in its upper position the balls 110 are stationary.

The material for sealing the bottles as thus described, it will be noted, comprises the relatively small diameter disk 70 and the relatively large sheet material piece 71 which is preferably also in disk form. As shown in Figure 14, the small disk 70 may be arranged in a stack in a receptacle 150 which may be carried by the bracket 4, there being one such receptacle for each capping device. The elements 71, may, as shown best in Figure 19, be partially severed from a strip and this strip may be formed into a coil, as shown in Figure 1 at 152, from which the element 71 may be led off and completely severed as desired. If desired, also, they may have their margins coated with material of a thermoplastic nature which may be softened under heat to facilitate their conformation to the necks of the bottles, whereupon on being allowed to cool they rigidify and effectively resist accidental removal. Where this is desired a heating element of any suitable description, such as an electric heater shown at 155, may be secured by any suitable means to the lower face of the clamp member 65, so that these clamp members will be heated and soften the marginal portion of the element 71 preparatory to the conforming of this margin to the bottle top.

Cap strip feed

The elements 71 are fed into position between the clamps, the sleeve 60 having a slot at 158 for this purpose, and one or both of the clamp elements may have cutting edges as at 159 so that the closing of the clamp on the initial downward motion of the sleeve 11 will complete the severing of the element 71 in capping position from those outside of the sleeve 60. The coil 152 may be supported on a suitable holder 160 carried by a platform portion 161 which connects and spaces the brackets 4, and this may also be supported by a bracket 162 and a link 163 from the table 1, a slot 164 in the link 163 permitting vertical adjustment of the bracket 4 as desired, to suit the height of the bottles being capped.

Cap disk feeding mechanism

The actuating bracket 15 has on the outer end of its arm 26 a sleeve 200 slidably engaging a cap feeding actuating rod 201, there being one of these rods 201 for each capping device. A collar 202 is fixed to the upper end of each of the rods 201 and a collar 203 is slidable thereon and is normally held pressed against the upper end of the sleeve 200, as by means of a coil spring 204. The sleeve 200 rests on the upper end of a spring 205, the lower end of which is seated against a shoulder 206 formed on the lower bifurcated end 207 of the rod 201. This bifurcated portion 207 is pivoted to one end of an arm 208 fixed to a rock shaft 209 carried by the stack supply 150, and on opposite sides thereof arms 210 are carried by this rock shaft. The lower ends of the arms 210 are slotted as at 211 to take over a pin 212 which extends through a feed slide 215.

This feed slide, as shown best in Figure 3, is movable along a track 220 and is provided with a plate 221 which is slidable beneath the open lower end of the stack support 150 so that on the inward motion of the slide it takes the lowest disk in the stack and moves it from the stack and projects it into the sleeve 45 through the slot 50, while in its outward movement it slides beneath the disks in the stack to its extreme retracted position shown in Figure 3 in which it permits the stack to descend to present the lowest disk thereon into position to be engaged on the next feeding movement of the slide. The slide 215 also carries a feed dog 225 having a serrated foot 226 which rests on the upper face of the strip of elements 71, and as the slide is moved to feed a disk from the reservoir 150 it also feeds the strip of elements 71 in the guideway 228. Retractive motion of the strip on reverse motion of the slide 215 is prevented by abutments 230 projecting upwardly from the guide 228 and presenting inclined or sloping faces 231 to the forward passage of an element 71 and abrupt shoulder portions 232 to the rear edge portions of an element 71. On each capping motion of the bracket 15 the sleeve 200 descends, and through its pressure on the spring 205, rocks the lever 208 and the arm 210 to retract the feed slide 215. On each upward motion of the member 25 the feed slide remains in its outer position until contact is made with the collar 203, whereupon further upward motion normally produces a feed stroke of the slide 215 when all the cap-applying parts are in proper position to receive the disks 70 and 71.

Means are provided, however, by which, should no bottle be in position beneath the clamping device on a capping stroke so that the disks would not be applied to a bottle and thus removed with it on the up-stroke, whereby on the next upward stroke of the cap-applying mechanism the feed slide is inoperative to feed other disks and elements 71 to the capping mechanism. To this end the upper arm 208 is provided with an extension 241, which, when no bottle has been present, is held beneath a locking dog 242 pivoted as at 243 to the portion 150. This locking dog 242 may be retained in either of two angular positions as by means of a spring ball detent or dog at 244 (see Figure 10) which may engage in either of a pair of depressions 245 and 246 in the dog 242. This dog is provided with an angular cam tail 248 against which may ride a roller 249 on a cam lever 250 pivoted as at 251 to a bracket support 252 secured to the upper face of the sleeve plug 12. A stop lug 253 limits the rocking movement of the lever 250 in one direction. When a bottle is in position to be acted on the descent of the sleeve 11 is limited by the clamp sleeve 45 striking on an element 71 over the bottle mouth and by the engagement of the flange 37 of the plunger 35 against the upper end of the sleeve 45, and this plunger in turn against the plug 12, as is shown substantially in Figure 13. At this lower limit of motion the roller 249 engages the shoulder portion 255 of the cam tail 248, thus holding the dog 242 out of the path of motion of the portion 241 of the lever 208, or, if the dog was not previously in this position, moving it thereto as shown in Figure 7. On the next upstroke of the capping mechanism, therefore, there is nothing to prevent the feeding motion of the cap slide so that the mechanism functions in its normal manner. If, however, no bottle has been in capping position, the sleeve 11 is permitted a downward motion further than its normal limit into the position shown in Figure 8, whereupon the roller 249 is brought down against the portion 256 of the stop dog, forcing it into the position shown in Figure 8 where it obstructs the motion of the arm 208, and thus prevents the cap feeding motion on the succeeding retraction of the bracket 15, the final portion of this retraction being expended in compressing the spring 204. On the next downward motion of the capping mechanism, when this mechanism approaches the normal limit, as when a bottle is present, the roller 249 engaging on the tail 248, moves the dog out of engagement with the portion 241, but if this downward motion is prolonged, as when no bottle is present, it immediately returns the dog to obstructing position as shown in Figure 8. Upward motion of the capping mechanism is ineffective to move the dog since the roller 249 is permitted to be depressed, rocking the lever 250 away from the stop 252, the ball detent holding the dog against the relatively small pressure necessary to effect the rocking of the lever 250 as shown in Figure 9.

From the foregoing description of certain embodiments of this invention, it should be evident to those skilled in the art that various changes and modifications might be made without departing from the spirit or scope of this invention as defined by the appended claims.

I claim:

1. In a bottle capping machine, a plurality of outwardly yieldable wipers arranged in circular series, means for moving said wipers as a unit axially of the bottle to wipe the marginal portion of sheet material extending across the mouth of said bottle down around and beneath a rim at said mouth, and means for rotating said wipers about the bottle axis, said means including a continuously rotating drive element and a driven element connected to said wipers and in driven relation to said driving element only when said wipers are in sheet material engaging axial position.

2. In a bottle capping machine, a tubular member having an internal undercut shoulder, a series of bars having tapered extremities, one of which extremities is engageable with said shoulder, a ring engageable within said member spaced from said shoulder and having a tapered end engageable with the other ends of said bars to retain them in assembled position, and yielding cap engaging elements carried by said bars.

3. In a bottle capper, a plurality of cap-engaging elements arranged in circular series and between which the mouth of a bottle to be capped may be extended, and a ball journaled in each of said elements for engagement with a cap.

4. In a bottle capper, a plurality of cap-engaging elements arranged in circular series and between which the mouth of a bottle to be capped may be extended, a ball journaled in each of said elements for engagement with a cap, means for turning said elements about the axis of said series, and means for moving said elements and bottle relatively axially of said bottle while in contact with each other.

5. In a bottle capping machine, a series of bars each having a flange portion projecting from one edge and a pin projecting from said portion spaced from a face of said bar, a spring element engaged between each pin and said face, and means for holding said bars in circular series with said flanges in spaced relation, adjacent pairs of flanges retaining between them one of said elements.

6. In a bottle capping machine, a series of bars each having a flange portion projecting from one edge and a pin projecting from said portion spaced from a face of said bar, a spring element engaged between each pin and said face, a tubular member within which said bars are positioned for holding said bars in circular series with said flanges in spaced relation, adjacent pairs of flanges retaining between them one of said elements, and means for securing said bars within said member.

7. In a bottle capping machine, a sleeve having an annular end portion for holding capping material against the top of a bottle mouth, means for crimpling the material outwardly of said holding portion, means movable axially of said sleeve for wiping the crimped portion of the material about the outer face of said bottle mouth, and means for rotating said wiping means about the axis of said sleeve.

8. In a bottle capping machine, a bracket having a bore for slidably receiving a capping mechanism, said mechanism comprising three concentric members slidable relative to each other and within said bore, the inner member having a head at its upper end slidably guided for limited motion in the outer of said members and closed off at its lower end to form a cap-applying plunger, a spring reacting between said head and the intermediate member, the lower end of which intermediate member is shaped to clamp sheet material against the upper end of a bottle to be capped, said outer member carrying the upper member of a marginal sheet material clamp, a lower annular clamp member spring-supported from said outer concentric member, wipers carried by said outer concentric member above its clamping portion for wiping the marginal portion of a capping member released from between said clamping members down about the mouth of a bottle to be capped, an actuating rod slidably guided in the innermost concentric member and spring-supported therefrom and having a head engaging said outer concentric member to lift said concentric members, means carried by said support for limiting the upward motion of said lower clamp member as said concentric members are lifted to release clamping pressure on the capping material, and means for reciprocating said rod.

9. In a bottle capping machine, a bracket having a bore for slidably receiving a capping mechanism, said mechanism comprising three concentric members slidable relative to each other and within said bore, the inner member having a head at its upper end slidably guided for limited motion in the outer of said members and closed off at its lower end to form a cap-applying plunger, a spring reacting between said head and the intermediate member, the lower end of which intermediate member is shaped to clamp sheet material against the upper end of a bottle to be capped, said outer member carrying the upper member of a marginal sheet material clamp, a lower annular clamp member spring-supported from said outer concentric member, wipers carried by said outer concentric member above its clamping portion for wiping the marginal portion of a capping member released from between said clamping members down about the mouth of a bottle to be capped, an actuating rod slidably guided in the innermost concentric member and spring-supported therefrom and having a head engaging said outer concentric member to lift said concentric members, means carried by said support for limiting the upward motion of said lower clamp member as said concentric members are lifted to release clamping pressure on the capping material, means for reciprocating said rod, said outer and intermediate concentric members having slots mating when said concentric members are lifted, and means acting to feed a disk through said slots beneath said plunger.

10. In a bottle capping machine, a bracket having a bore for slidably receiving a capping mechanism, said mechanism comprising three concentric members slidable relative to each other and within said bore, the inner member having a head at its upper end slidably guided for limited motion in the outer of said members and closed off at its lower end to form a cap-applying plunger, a spring reacting between said head and the intermediate member, the lower end of which intermediate member is shaped to clamp sheet material against the upper end of a bottle to be capped, said outer member carrying the upper member of a marginal sheet material clamp, a lower annular clamp member spring-supported from said outer concentric member, wipers carried by said outer concentric member above its clamping portion for wiping the marginal portion of a capping member released from between said clamping members down about the mouth of a bottle to be capped, an actuating rod slidably guided in the innermost concentric member and spring-supported therefrom and having a head engaging said outer concentric member to lift said concentric member, means carried by said support for limiting the upward motion of said lower clamp member as said concentric members are lifted to release clamping pressure on the capping material, means for reciprocating said rod, said outer and intermediate concentric members having slots mating when said concentric members are lifted, and means acting to feed a disk through said slots beneath said plunger and for simultaneously feeding sheet material between said clamping members.

11. In a bottle capping machine, a bracket having a bore for slidably receiving a capping mechanism, said mechanism comprising three concentric members slidable relative to each other and within said bore, the inner member having a head at its upper end slidably guided for limited motion in the outer of said members and closed off at its lower end to form a cap-applying plunger, a spring reacting between said head and the intermediate member, the lower end of which intermediate member is shaped to clamp sheet material against the upper end of a bottle to be capped, said outer member carrying the upper member of a marginal sheet material clamp, a lower annular clamp member spring supported from said outer concentric member, wipers carried by said outer concentric member above its clamping portion for wiping the marginal portion of a capping member released from between said clamping members down about the mouth of a bottle to be capped, an actuating rod slidably guided in the innermost concentric member and spring supported therefrom and having a head engaging said outer concentric member to lift said concentric member, means carried by said support for limiting the upward motion of said lower clamp member as said concentric members are lifted to release clamping pressure of the capping material, means for reciprocating said rod, said outer and intermediate concentric members having slots mating when said concentric members are lifted, and means acting to feed a disk through said slots beneath said plunger and for simultaneously feeding sheet material between said clamping members, said machine including means for rendering said feeding means inoperative should a bottle not have been in capping position after the previous feed.

12. A bottle capping machine comprising three concentric members, the outermost of said members being a sleeve and having its lower end formed to clamp sheet material, the intermediate member being formed as a sleeve with its lower end shaped to clamp said sheet material against the mouth of a bottle to be capped, the inner of said members being formed as a plunger to depress the central portion of said sheet material into the bottle mouth, wipers supported between said intermediate and outer members for wiping the margin of said sheet material about the outside of the bottle adjacent to its top, and means for moving said concentric members relatively axially in proper timed relation to conform said material to the mouth portion of the bottle.

13. A bottle capping machine comprising three concentric members, the outermost of said members being a sleeve and having its lower end formed to clamp sheet material, the intermediate member being formed as a sleeve with its lower end shaped to clamp said sheet material against the mouth of a bottle to be capped, the inner of said members being formed as a plunger to depress the central portion of said sheet material into the bottle mouth, wipers supported between said intermediate and outer members for wiping the margin of said sheet material about the outside of the bottle adjacent to its top, each of said wipers having a ball journaled therein for contact with said sheet material, and means for moving said concentric members relatively axially in proper timed relation to conform said material to the mouth portion of the bottle.

14. A bottle capping machine comprising three concentric members, the outermost of said members being a sleeve and having its lower end formed to clamp sheet material, the intermediate member being formed as a sleeve with its lower end shaped to clamp said sheet material against the mouth of a bottle to be capped, the inner of said members being formed as a plunger to depress the central portion of said sheet material into the bottle mouth, wipers supported between said intermediate and outer members for wiping the margin of said sheet material about the outside of the bottle adjacent to its top, means for rotating said wipers about the axis of said concentric members, and means for moving said concentric members relatively axially in proper timed relation to conform said material to the mouth portion of the bottle.

15. A bottle capping machine comprising three concentric members, the outermost of said members being a sleeve and having its lower end formed to clamp sheet material, the intermediate member being formed as a sleeve with its lower end shaped to clamp said sheet material against the mouth of a bottle to be capped, the inner of said members being formed as a plunger to depress the central portion of said sheet material into the bottle mouth, wipers supported between said intermediate and outer members for wiping the margin of said sheet material about the outside of the bottle adjacent to its top, each of said wipers having a ball journaled for contact with said sheet material, means for rotating said wipers about the axis of said concentric members, and means for moving said concentric members relatively axially in proper timed relation to conform said material to the mouth portion of the bottle.

16. A bottle capping machine comprising three concentric members, the outermost of said members being a sleeve and having its lower end formed to clamp sheet material, the intermediate member being formed as a sleeve with its lower end shaped to clamp said sheet material against the mouth of a bottle to be capped, the inner of said members being formed as a plunger to depress the central portion of said sheet material into the bottle mouth, wipers supported between said intermediate and outer members for wiping the margin of said sheet material about the outside of the bottle adjacent to its top, means for moving said concentric members relatively axially in proper timed relation to conform said material to the mouth portion of the bottle, and means for rotating said wipers about the axis of said concentric members only when said wipers are in engagement with said sheet material.

17. A bottle capping machine comprising three concentric members, the outermost of said members being a sleeve and having its lower end formed to clamp sheet material, the intermediate member being formed as a sleeve with its lower end shaped to clamp said sheet material against the mouth of a bottle to be capped, the inner of said members being formed as a plunger to depress the central portion of said sheet material into the bottle mouth, wipers supported between said intermediate and outer members for wiping the margin of said sheet material about the outside of the bottle adjacent to its top, means for moving said concentric members relatively axially in proper timed relation to conform said material to the mouth portion of the bottle, and means including a driving clutch for rotating said wipers constructed and arranged to close when said wipers are moved downwardly with said outermost member into wiping position and to be open at other times.

EWALD G. BAUM.